United States Patent [19]

Anno et al.

[11] 4,369,452

[45] Jan. 18, 1983

[54] THERMAL RECORDING HEAD

[75] Inventors: Gousuke Anno, Kawasaki; Tamio Saitou, Oume; Yoshikatsu Fukumoto, Tokyo; Kiyomi Tagaya, Oume, all of Japan

[73] Assignee: Tokyo Shibaura Denki Kabushiki Kaisha, Kawasaki, Japan

[21] Appl. No.: 228,671

[22] Filed: Jan. 26, 1981

[30] Foreign Application Priority Data

Jan. 31, 1980 [JP] Japan ................................ 55/10273

[51] Int. Cl.³ .................... G01D 15/10; H05B 3/00
[52] U.S. Cl. ............................. 346/76 PH; 219/216
[58] Field of Search .................. 346/76 PH; 219/216

[56] References Cited

U.S. PATENT DOCUMENTS 4,224,869 9/1980 Morin ..................... 346/76 PH X

FOREIGN PATENT DOCUMENTS 52-105840 9/1977 Japan .
53-13434 2/1978 Japan .
54-48562 4/1979 Japan .
54-56320 5/1979 Japan .

OTHER PUBLICATIONS

Waller, Larry, "Thick-Film Heads Print 8 Dots/MM", *Electronics*, Feb. 14, 1980.

*Primary Examiner*—George H. Miller, Jr.
*Attorney, Agent, or Firm*—Schuyler, Banner, Birch, McKie & Beckett

[57] ABSTRACT

The present invention is directed to a thermal recording head. The thermal recording head includes an insulated substrate, a plurality of thermal resistive elements placed in a line on the insulated substrate, a plurality of drive circuits having signal input terminals, current supply terminals and output terminals, each output terminal of the drive circuits being connected to each thermal resistive element. A shift register having a plurality of memory units, the number of which is the same as the number of thermal resistive elements, is connected to the drive circuits with each memory unit being connected to each signal input terminal. The shift register receives serial input (pictures) signals and supplies these signals to the drive circuits in parallel. A metal cover is placed on the insulated substrate to cover the shift register and the drive circuits, the metal cover being connected to the current supply terminals of the drive circuits.

8 Claims, 6 Drawing Figures

THERMAL RECORDING HEAD

BACKGROUND OF THE INVENTION

This invention relates to a thermal recording head for a thermal recording apparatus and, more particularly, to a thermal recording head having drive circuits and a shift register for supplying picture signals in parallel to thermal resistive elements on an insulated substrate. The incoming picture signals are received in serial form by the shift register, converted to parallel signals and supplied to the drive circuits which drive the thermal resistive elements.

Currently, thermal recording techniques are used in many fields because of easy maintenance and low cost. In such recording techniques, thermal resistive elements are placed in a line and a thermal sensitive paper is passed over the line of elements. The thermal resistive elements are selectively heated to record the image on the thermal sensitive paper.

In prior art thermal recording techniques, matrix circuits are used to decrease the number of lead lines and drive circuits. The matrix circuits are circuits that supply picture signals to separate groups of thermal resistive elements over parallel lead lines. The matrix circuits select one of these groups at a time. However, it is necessary to provide an additional lead line to each group of thermal resistive elements for selecting the particular group to receive the picture signals. The total number of lead lines to each group is more than the number of thermal resistive elements in one group.

To decrease the number of lead lines, a thermal recording head is disclosed in Japanese patent disclosures Nos. 54-48562 and 54-56320 in which shift registers convert incoming serial signals into parallel signals. However, this thermal recording head requires a long time ($T=m \cdot t$) to record one line because matrix circuits are used to supply the picture signals from the shift registers to the thermal resistive elements. Here, t is the time necessary to actuate one element and m is the number of groups of thermal resistive elements.

Other types of thermal heads are disclosed in Japanese patent disclosures Nos. 52-105840 and 53-13434. These thermal heads have memory elements associated with each thermal resistive element to store the picture signal so all thermal resistive elements can be actuated at the same time. The picture signals are successively supplied in parallel to each group of memory elements at high speed and then the line of thermal resistive elements is actuated by all groups of memory elements at the same time. However, these thermal heads require a number of lead lines which is greater than the number of thermal resistive elements of one group. Furthermore, these thermal heads require a number of memory elements, which number is the same as the number of thermal resistive elements, and a switch having large current capacity.

SUMMARY OF THE INVENTION

It is one object of this invention to provide a thermal recording head capable of recording at high speed.

It is another object of this invention to provide a thermal recording head usable in thermal recording apparatus in which all the desired thermal resistive elements are driven at the same time (e.g. recording apparatus for facsimile signals).

It is yet another object of this invention to provide a thermal recording head having a small number of lead lines.

It is a further object of this invention to provide a thermal recording head having simple structure and which eliminates the necessity for a switch having large current capacity.

It is another object of this invention to provide a thermal recording head capable of recording at low speed according to the speed of the input signals.

According to this invention, the foregoing and other objects are attained by providing a thermal recording head as described herein. The thermal recording head includes an insulated substrate, a plurality of thermal resistive elements in line on the insulated substrate, a plurality of drive circuits having signal input terminals, current supply terminals and output terminals, each output terminal of the drive circuits being connected to each thermal resistive element. A shift register having a plurality of memory units, the number of which is the same as the number of thermal resistive elements, receives the input signals. Each memory unit is connected to each signal input terminal of the drive circuits. The shift register receives serial input signals and supplies picture signals to the drive circuits in parallel. A metal cover is placed on the insulated substrate to cover the shift register and the drive circuits. The metal cover is connected to the current supply terminals of the drive circuits.

By this invention, it is not necessary to have a large number of lead lines connected to the thermal recording head because a shift register having a plurality of memory units, the number of which is the same as the number of thermal resistive elements, is used to receive serial picture signals which are converted to parallel by the shift register. Also, fast recording is possible and a switch having large current capacity is unnecessary because matrix circuits are not used and all the thermal resistive elements can be activated after picture signals are stored in the shift register. Each thermal resistive element corresponds to one drive circuit and one memory unit.

Finally, a sufficient amount of current can be delivered to all the thermal resistive elements because a metal cover, which covers the drive circuits and the shift register, is connected to the current supply terminals of the drive circuits. The metal cover forms a current supply bus. Therefore, this invention is suitable for thermal recording apparatus in which all the desired thermal resistive elements can be driven at the same time (e.g., recording apparatus for facsimile signals).

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which.

DESCRIPTION OF THE PREFERRED EMBODIMENTS

Figure 1:
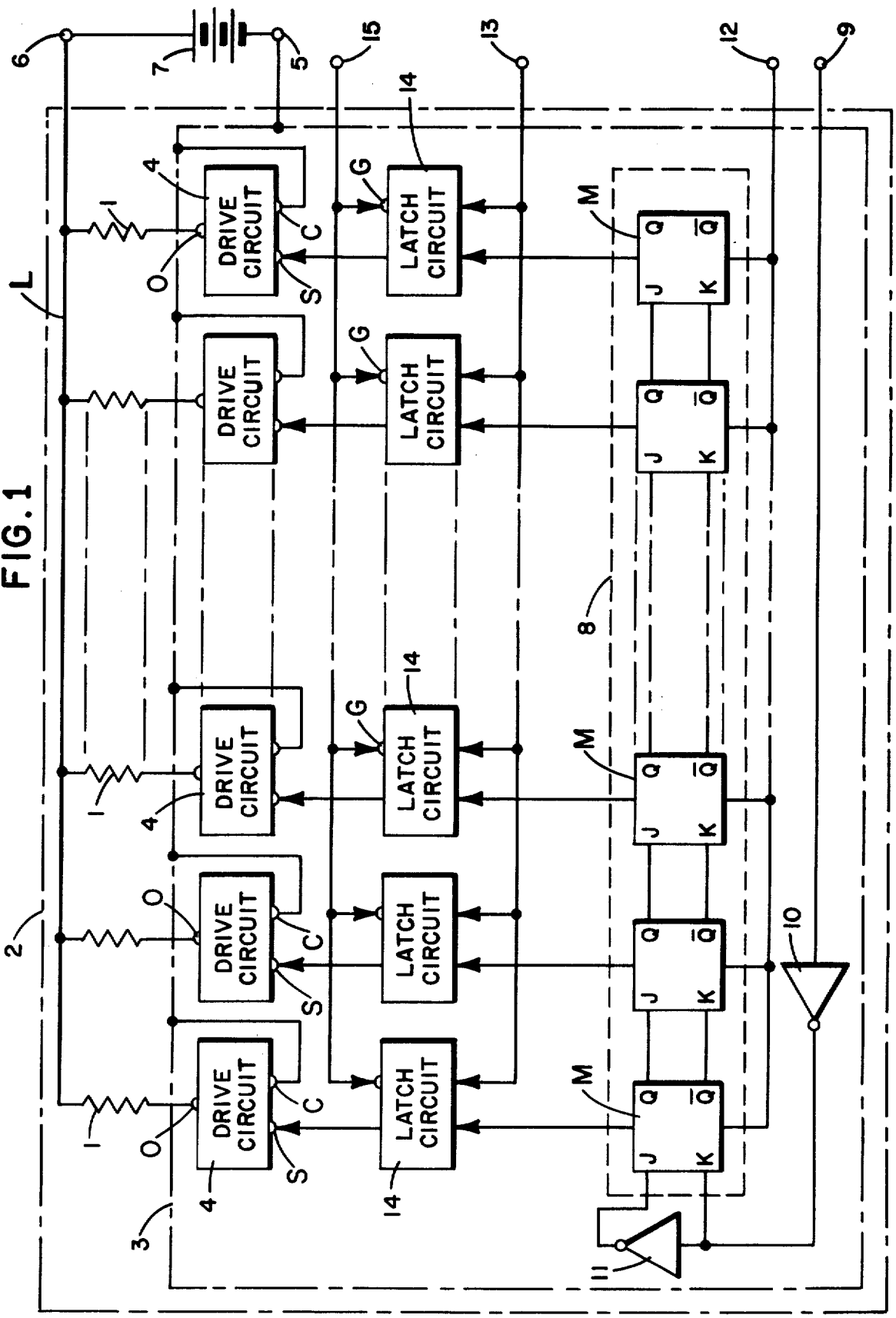
FIG. 1 shows a wiring diagram of one embodiment of this invention.
Figure 2:
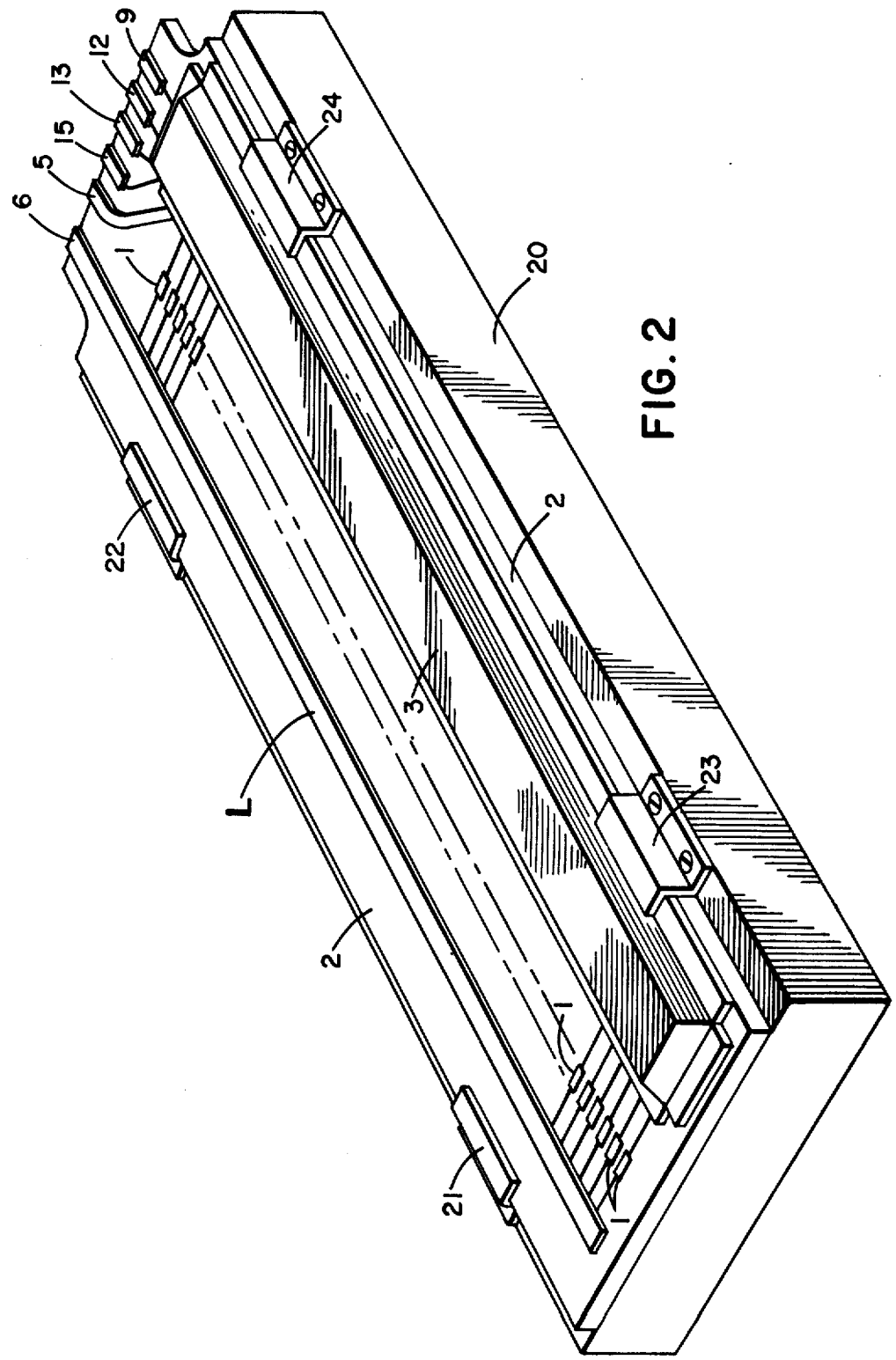
FIG. 2 shows a perspective view of the embodiment of FIG. 1.

FIGS. 1 and 2 show a wiring diagram and a perspective view of one embodiment of the thermal recording head of this invention. A plurality of thermal resistive elements 1 are placed in line on an insulated substrate 2 shown as a dash and dot line in FIG. 1. The ends of each thermal resistive element 1 are connected in common by a current supply bus L. A metal cover 3 covers a plurality of drive circuits 4, latch circuits 14 and a shift register 8. Metal cover 3 has two functions: one function is to hermetically seal the electrical circuits and another function is to act as a large current supply bus. For example, metal cover 3 is 20 cm long, 3 cm wide and 0.5 mm thick. The resistance of metal cover 3 is about 0.3 m ohms. Metal cover 3 is shown as a dash and two dot line in FIG. 1. Insulated substrate 2, which radiates heat, is fixed on a metal plate 20 by clamps 21, 22, 23 and 24.

Drive circuits 4 independently drive thermal resistive elements 1 according to the incoming picture signals. Namely, each drive circuit 4 includes a switching element having a signal input terminal (S), a current supply terminal (C) and an output terminal (O). Output terminals (O) are connected to the other ends of thermal resistive elements 1 and all current supply terminals (C) are connected to a common current terminal 5 through metal cover 3. In operation, an external D.C. power source 7 is connected between current terminal 5 and source terminal 6 of current supply bus L as shown in FIG. 1.

Shift register 8 has a plurality of memory units (M) (e.g., flip-flops), the number of which is the same as the number of thermal resistive elements 1 (e.g., 1728 bits). In this embodiment, these memory units (M) are serially connected. Shift register 8 receives serial picture signals from a signal input line connected to input terminal 9 via inverters 10 and 11. The picture signals are transferred or shifted through the shift register in accordance with clock signals input at clock terminal 12; the picture signals are stored in the memory units (M).

After picture signals of one line are stored in shift register 8, as stated above, a latch signal is input to latch terminal 13. Then each picture signal stored in each memory unit is transferred to each latch circuit 14. Each latch circuit 14 has gate terminal (G) controlled by a drive signal from terminal 15; upon receipt of the drive signal, all the latch circuits 14 output their content (0 or 1) to their respective drive circuits 4. The drive circuits 4 which receive a (1) from latch circuits 14 are activated and the switching element in each of these drive circuits is turned on to actuate the desired thermal resistive elements 1. A thermal sensitive paper (not shown) is moved across the thermal resistive elements and the heated or actuated thermal resistive elements turn the corresponding portions of the thermal sensitive paper black. The drive signal at terminal 15 is supplied when it is desired to record (e.g., for a duration of 1–4 msec.). When the drive signal terminates, current does not flow in thermal resistive elements 1. When the recording of one line is finished, the thermal sensitive paper moves a predetermined distance and the recording of the next line is executed.

In addition, in this embodiment, current terminal 5, and all the current supply terminals (C) of drive circuits 4, are connected to metal cover 3. Therefore, even if almost all of the drive circuits 4 must be activated, it is possible to supply sufficient current to each drive circuit.

In the above embodiment, insulated substrate 2 is fixed on a metal plate by metal clamps 23 and 24 for radiating heat generated by the current flow in metal cover 3. Therefore, the heat generated by large current can be sufficiently radiated.

Also, in the embodiment shown in FIGS. 1 and 2, it is possible to supply successive picture signals into input terminal 9 because the thermal recording head has a plurality of latch circuits 14, which makes faster recording possible. Namely, without these latch circuits 14, it would be necessary to transfer successive picture signals only after the recording of one line is finished. Therefore, recording can occur while picture signals are transferred to shift register 8.

An example of the details of the first embodiment will now be given. The length of one line is 1728 bits and the electrical circuit covered by metal cover 3 is constructed of $C^2MOS$. If the frequency of transfer clock signal is 1 MHz, the transfer time of one line is 1.728 msec and if the frequency is 3 MHz, the transfer time is 0.576 msec. Thus, it is possible to use high speed TTL integrated circuits as shift register 8. However, use of these integrated circuits is undesirable because they generate heat. The current supply bus L is constructed of thin metal film and thick Cu film. The thick Cu film can be formed by galvanizing or it can be fixed beforehand on the thin film by pewter or conductive epoxy.

Finally, by using latch circuits 14, and inputting the next set of picture signals during recording of the first line of picture signals, picture signals can continually be supplied into shift register 8; as a result, the overall recording time can be decreased. The recording time of one line is nearly the same as the recording time of one element. Also, the number of lead lines or input terminals for the incoming picture signals is only one because shift register 8 has serial memory units (M).

Figure 3:
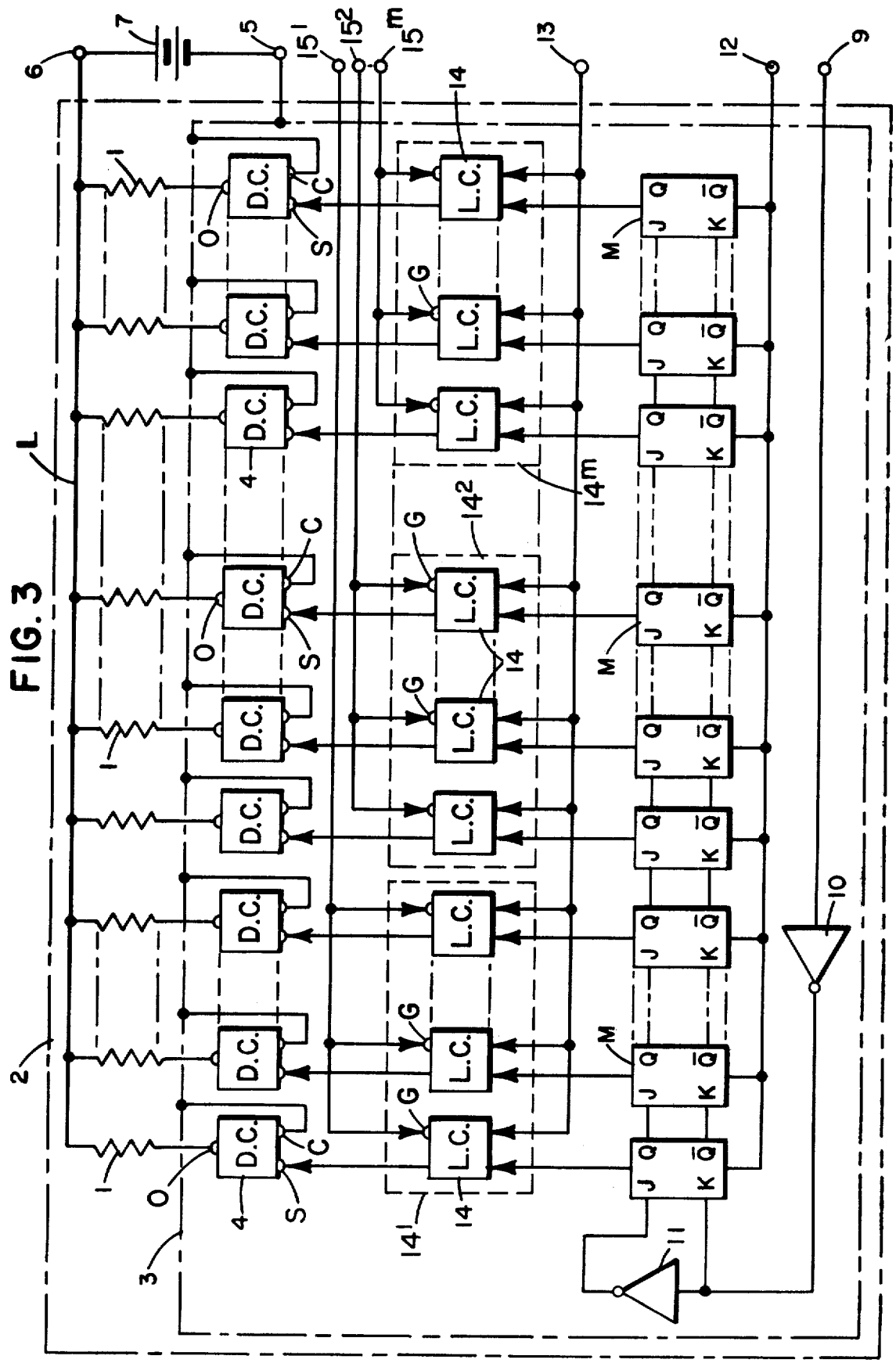
FIG. 3 shows a wiring diagram of another embodiment of this invention.

Another embodiment of this invention is shown in FIG. 3. The latch circuits 14 are divided into a plurality of groups (e.g., m groups). The latch circuits of each group are connected terminals $15^1$, $15^2$, ... $15^m$ by gate terminals (G) connected in common as shown in FIG. 3. Each group $14^1$, $14^2$, ... $14^m$ of the latch circuits can be independently operated by respectively supplying drive signals to gate terminals over terminals 15. In this embodiment, a power source 7 having small capacity can be used because all the drive circuits in each group are activated in accordance with each group of latch circuits $14^1$, $14^2$, ... $14^m$ by supplying drive signals to terminals $15^1$, $15^2$, ... $15^m$ in order.

The drive signals are supplied to these terminals $15^1$, $15^2$, ... $15^m$ in accordance with picture signals supplied to input terminal 9. Namely, in case the picture signals of one line have only a few black signals (logic 1), drive signals are supplied to terminals $15^1$, $15^2$, ... $15^m$ at the same time. When picture signals of one line have many black signals, drive signals are selectively supplied to terminals 15. Thus, it is possible to increase recording speed without using a power source having large capacity.

Figure 4:
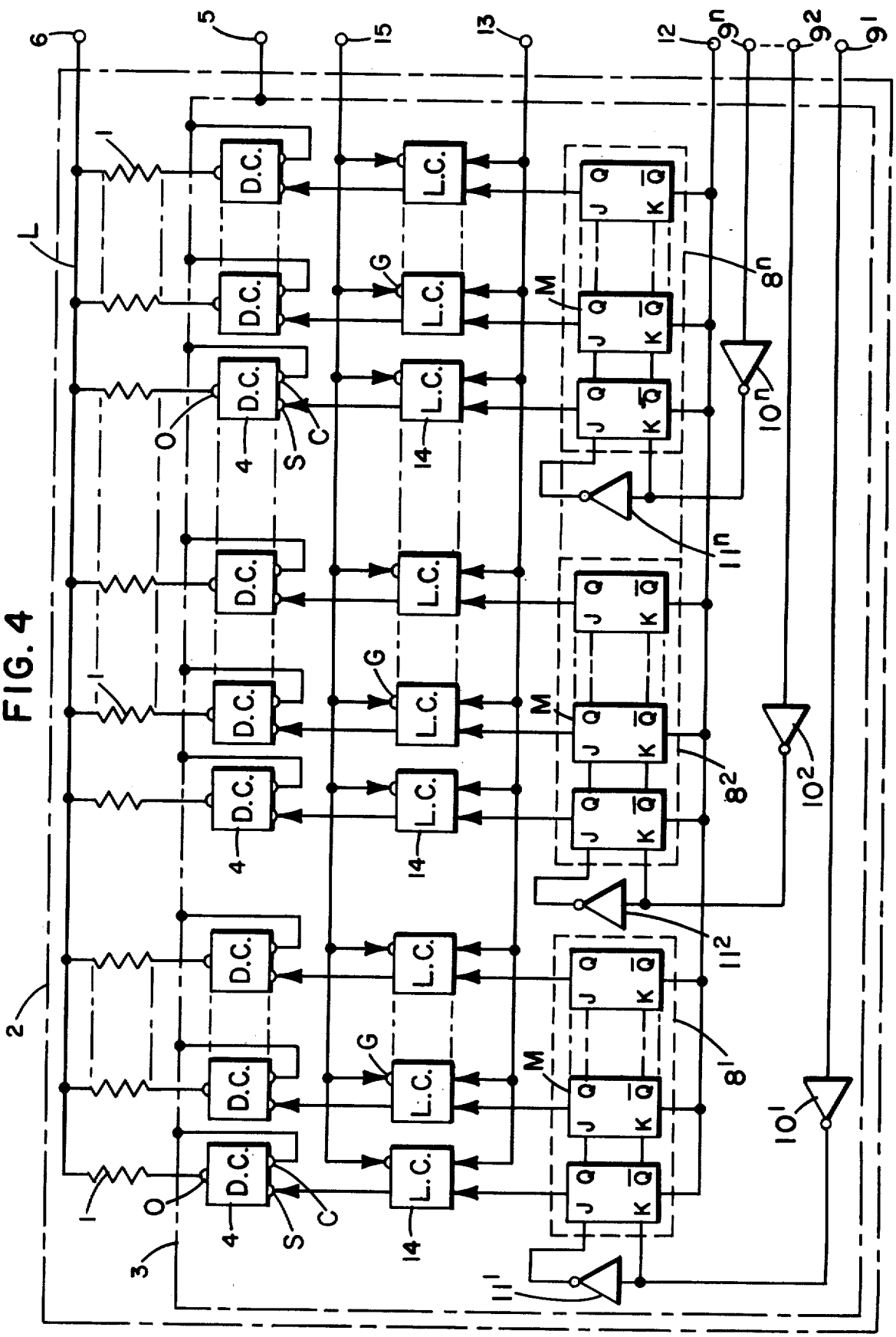
FIG. 4 shows a wiring diagram of another embodiment of this invention.

Another embodiment of this invention is shown in FIG. 4. In this embodiment, a plurality of shift registers $8^1$, $8^2$, ... $8^n$ are used. Input terminals $9^1$, $9^2$, ... $9^n$ and inverters $10^1$, $10^2$, ... $10^n$, and $11^1$, $11^2$, ... $11^n$ are connected to every shift register 8. Here, n is a relatively small number (e.g., n=2, 4). The previous embodiments required a relatively long time to input picture signals of one line because all memory units of shift register 8 are connected in series. On the other hand, in the embodiment shown in FIG. 4, a relatively short time is required because picture signals of one line can be supplied separately. In this embodiment, the time for supplying picture signals becomes 1/n in comparison with the previous embodiments.

In the embodiments shown in FIGS. 3 and 4, a plurality of either terminals 15 or input (picture signal) terminals 9 are needed; therefore, the number of lead lines increases. The number of lead lines is m or n, which is still less than the number used in known systems.

Figure 5:
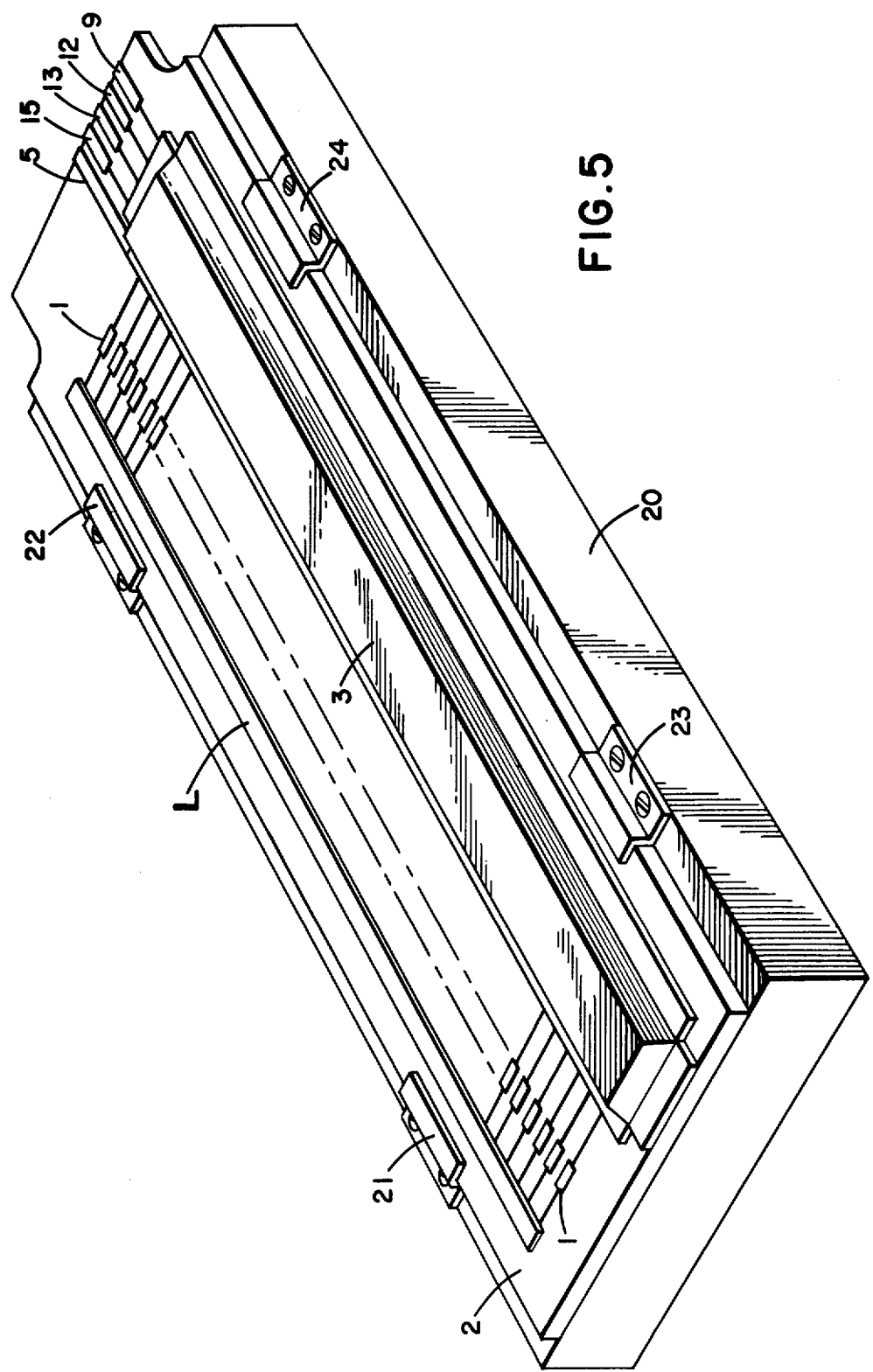
FIG. 5 shows a perspective view of another embodiment of this invention.

Another embodiment of this invention is shown in FIG. 5. In this embodiment, metal plate 20 is connected to current supply bus L via metal clamps 21 and 22. In this embodiment, current supply bus L is grounded and positive voltage is supplied to current terminal 5. The source terminal 6 is not necessary because metal plate 20 can be grounded.

Figure 6:
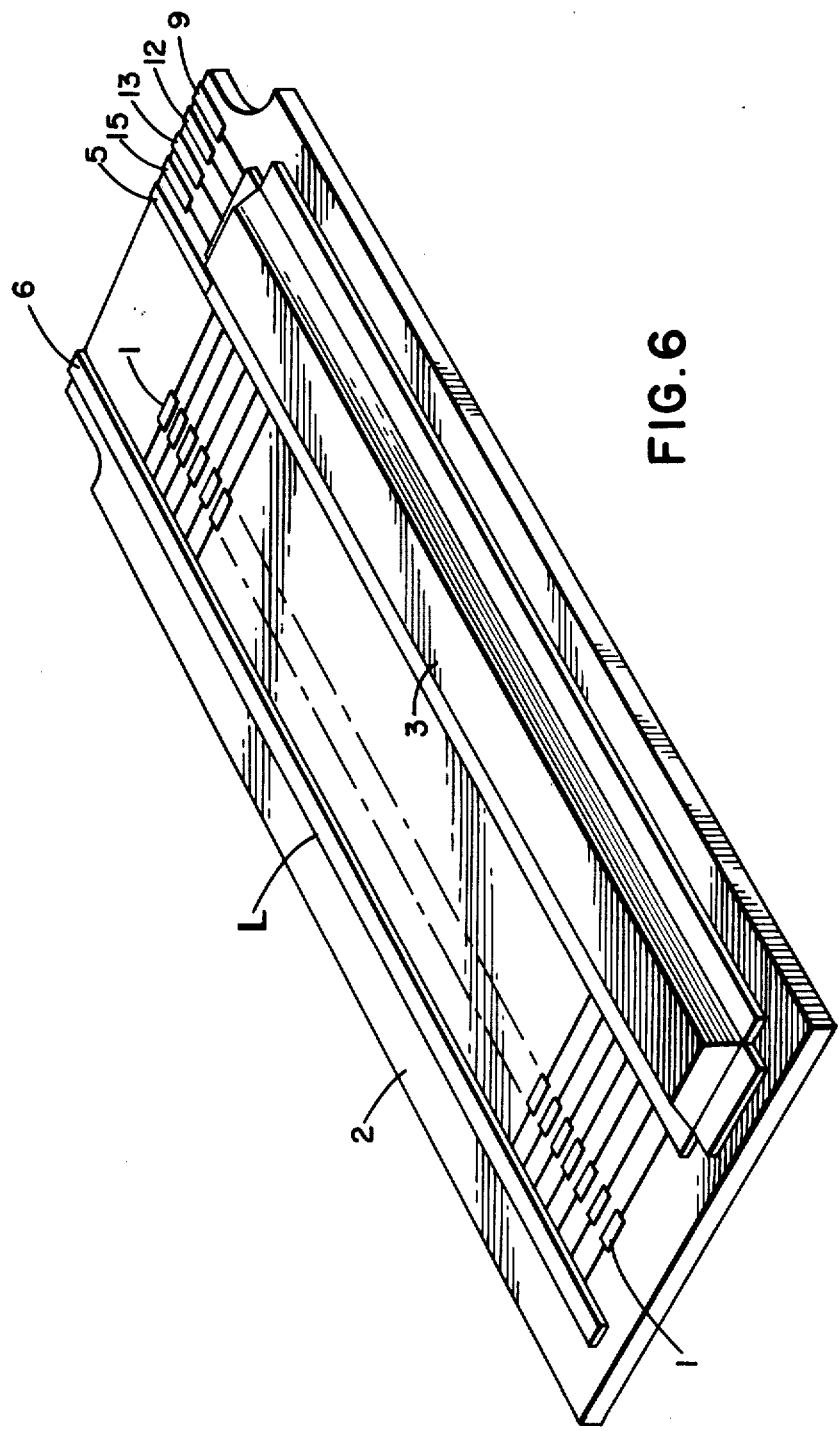
FIG. 6 shows a perspective view of a further embodiment of this invention.

In all the above embodiments, insulated substrate 2 is fixed on a metal plate. However, this metal plate is not necessary as shown in FIG. 6 where a power source is connected between current terminal 5 and source terminal 6.

Obviously, many modifications and variations of this invention are possible in the light of the above teachings. It is therefore understood that, within the scope of the appended claims, this invention may be practiced otherwise than as specifically described. For example, in the above embodiments, latch circuits having gate terminals are used. However, drive circuits having a gate function can be used instead. Also, it is possible to use ring counters, memories, charge coupled devices, etc. instead of a shift register.

We claim:

1. A thermal recording head comprising:
   an insulated substrate;
   a plurality of thermal resistive elements placed in line on said insulated substrate;
   a plurality of drive circuits placed on said insulated substrate, having signal input terminals, current supply terminals and output terminals, each output terminal of said drive circuits being connected to one of said thermal resistive elements;
   shift register means placed on said insulated substrate, having a plurality of memory units, the number of which is the same as the number of said thermal resistive elements, each said memory unit being connected to one of said signal input terminals of said plurality of drive circuits, said shift register means receiving serial picture signals and supplying parallel signals to the signal input terminals of said drive circuits; and
   a metal cover placed on said insulated substrate to cover said shift register means and said drive circuits, said metal cover being connected to the current supply terminals of said drive circuits.

2. A thermal recording head according to claim 1 wherein said shift register means comprises a plurality of memory units operating independently.

3. A thermal recording head comprising:
   a metal plate to radiate heat;
   an insulated substrate placed on said metal plate;
   a plurality of thermal resistive elements placed in line on said insulated substrate;
   a plurality of drive circuits placed on said insulated substrate, having signal input terminals, current supply terminals and output terminals, each output terminal of said drive circuits being connected to one of said thermal resistive elements;
   a plurality of latch circuits placed on said insulated substrate, having outputs connected to the current supply terminals of said drive circuits;
   shift register means placed on said insulated substrate, having a plurality of memory units, the number of which is the same as the number of said thermal resistive elements, said shift register means receiving serial picture signals and supplying parallel signals to the signal input terminals of said latch circuits; and
   a metal cover placed on said insulated substrate to cover said shift register means, said drive circuits and said latch circuits, said metal cover being connected to the current supply terminals of said drive circuits.

4. A thermal recording head according to claim 3 wherein said metal cover is connected to said metal plate.

5. A thermal recording head according to claim 3 wherein all said latch circuits are divided into a plurality of groups, each group of said latch circuits operating independently.

6. A thermal recording head according to claim 3 wherein said shift register means comprises a plurality of memory units operating independently.

7. A thermal recording head comprising:
   a metal plate to radiate heat;
   an insulated substrate placed on said metal plate;
   a plurality of thermal resistive elements placed in line on said insulated substrate, one end of each of said thermal resistive elements being connected to said metal plate;
   a plurality of drive circuits placed on said insulated substrate, having signal input terminals, current supply terminals and output terminals, each output terminal of said drive circuits being connected to the other end of one of said thermal resistive elements;
   shift register means placed on said insulated substrate, having a plurality of memory units, the number of which is the same as the number of said thermal resistive elements, each said memory unit being connected to one of said signal input terminals of said plurality of drive circuits, said shift register means receiving serial picture signals and supplying parallel signals to the signal input terminals of said drive circuits; and
   a metal cover placed on said insulated substrate to cover said shift register means and said drive circuits, said metal cover being connected to the current supply terminals of said drive circuits.

8. A thermal recording head according to claim 7 further comprising a plurality of latch circuits interconnected between the output terminals of said shift register means and the signal input terminals of said drive circuits.

* * * * *